US009275082B2

(12) United States Patent
Sharma (10) Patent No.: US 9,275,082 B2
(45) Date of Patent: Mar. 1, 2016

(54) USER-EXTENSIBLE COMMON SCHEMA IN A SHARED DATABASE

(71) Applicant: salesforce.com, inc., San Francisco, CA (US)

(72) Inventor: Anshu Sharma, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 171 days.

(21) Appl. No.: 13/748,449

(22) Filed: Jan. 23, 2013

(65) Prior Publication Data

US 2013/0191326 A1    Jul. 25, 2013

Related U.S. Application Data

(63) Continuation-in-part of application No. 13/364,316, filed on Feb. 1, 2012, now abandoned.

(60) Provisional application No. 61/438,559, filed on Feb. 1, 2011.

(51) Int. Cl.
    *G06F 17/30*          (2006.01)

(52) U.S. Cl.
    CPC ...... *G06F 17/30289* (2013.01); *G06F 17/3056* (2013.01); *G06F 17/30292* (2013.01)

(58) Field of Classification Search
    CPC ............... G06F 17/30017; G06F 17/30289; G06F 17/30321; G06F 17/30359
    USPC ................ 707/769, 781, 770; 705/26, 28
    See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |

(Continued)

OTHER PUBLICATIONS

Dewan et al., "An Experiment in Interoperating Heterogeneous Collaborative Systems", Proceedings of the Sixth European Conference on Computer-Supported Cooperative Work, Sep. 1999, pp. 371-389.*

*Primary Examiner* — Monica Pyo
(74) *Attorney, Agent, or Firm* — Blakely Sokoloff Taylor & Zafman LLP (57) ABSTRACT

A user-extensible common schema is described in the context of a shared database. In one example, an apparatus includes a shared database organized around a common schema. First and second applications provides access to the shared database using the common schema, the first and second applications having first and second schema extensions having first and second sets of additional objects, defined by the first and second applications, respectively. The first and second applications present views of and operations on the shared database that are extended by the respective schema extension.

15 Claims, 6 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,643,652 B2 * | 11/2003 | Helgeson |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,917,930 B1 | 7/2005 | Brodale et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,121,874 B1 | 2/2012 | Guheen et al. |
| 8,468,244 B2 * | 6/2013 | Redlich et al. ............. 709/225 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0086482 A1 | 4/2008 | Weissman |
| 2009/0177744 A1 | 7/2009 | Marlow et al. |
| 2010/0161759 A1 | 6/2010 | Brand |
| 2011/0106795 A1 | 5/2011 | Maim |
| 2011/0131335 A1 | 6/2011 | Spaltro |
| 2011/0145258 A1 | 6/2011 | Kankainen |

* cited by examiner

USER-EXTENSIBLE COMMON SCHEMA IN A SHARED DATABASE

CLAIM OF PRIORITY

This application is a Continuation In Part of U.S. patent application Ser. No. 13/364,316, entitled "Methods and Systems for Shared Data Sets in an Online Services Environment", by Sharma, filed Feb. 1, 2012, which claims the benefit of U.S. Provisional Patent Application No. 61/438,559 entitled "Shared Data Sets in an On-Line Services Environment", by Sharma, filed Feb. 1, 2011, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to maintaining information in databases and, in particular, to providing shared data sets to multiple customers or users.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, either on-premise databases or cloud-based databases, maintain information for different customers in separate databases. Even in some multi-tenant database systems, separate instances of a database may be used to store customer data. As a result, when two companies want to work together, typically, a copy of a company's entire data set has to be provided to the other company. This situation occurs even when the companies are using third party services to host their data.

Current data marketplaces provide data files for individual consumption by users. These marketplaces are typically independent systems, meaning other data systems import or access data from the marketplace.

BRIEF SUMMARY

In accordance with embodiments, there are provided mechanisms and methods for providing shared data sets for multiple users. These mechanisms and methods for providing shared data sets for multiple users can enable embodiments to provide more reliable and faster While the present invention is described with reference to an embodiment in which techniques for providing shared data sets for multiple users are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for providing shared data sets for multiple users. These systems and methods are particularly valuable in the context of a multi-tenant database. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Relational Shared Data Sets

To simplify the maintenance of shared data and preserve resources, in one embodiment, a system can provide a common shared data set to multiple customers or to multiple users. The common shared data set, in one implementation, is a common database hosting multiple users' information.

Basically, multiple data sets are hosted in one single, shared data repository. To the end user, this common data set looks no different than a system that employs multiple databases, according to one embodiment. The data displayed and available to the users, in this implementation, includes the information that is meant for them individually. To the end user the functionality of the system is no different than if there were multiple databases. However, at the database system layer, the data sets are stored as a shared single database that is accessed by multiple users, multiple customers, multiple accounts or any other account or data ownership entity.

In one implementation, an end user is able to make changes to data in the database without having those changes propagated to every other user of the database. The end user can make the changes to the database without accessing a different database (e.g., the user does not need to go to different places to make a change).

Because multiple people have access to the same data (e.g., in one physical repository), there may be instances when a customer overwrites data or data is changed by a certain user or customer. In one implementation, the database system tracks the changes by maintaining a table that lists the changes. This table may be called a delta table. The delta table may also be maintained in some other format. It could be a list, an object, an array, queue or other data structure.

To illustrate this idea, assume a shared database includes a data set that lists all of the zip codes and their associated streets in the U.S. This data set is accessed by multiple customers. In one instance, a local customer with access to the data set overwrites a local street name because the people living on the street call the street something different. However, this is a change not every customer wants propagated to the data set. In one implementation, the change is not pushed to the entire data set. It is maintained separately in the delta table. When the local customer accesses the local street name, the shared database system checks to see if there are any associated entries in the delta table. In one embodiment, a flag is set on the record in the shared database indicating that a customer has created a delta table entry for the record. Alternatively, a look-up could be performed each time a record is accessed. Alternatively, metadata associated with a customer includes the delta table and is consulted before performing any look-up.

In this way, customers can use a data set, make changes, and track the changes. The changes may appear to the customer, but the original, unchanged data set still exists so that changes can be reverted or hidden, if necessary. In addition, the unchanged data set is still available to all other customers.

In the same or different embodiments, the common shared database may be a multi-tenant database system and shared data set. In one implementation, the data sets are provided and managed by third parties. In such a case, the third parties provide and manage overwrites. The system, however, still determines what overwrites apply to which provider and to which consumer. In this way, the most updated and applicable version of data is displayed to the user.

Figure 1:
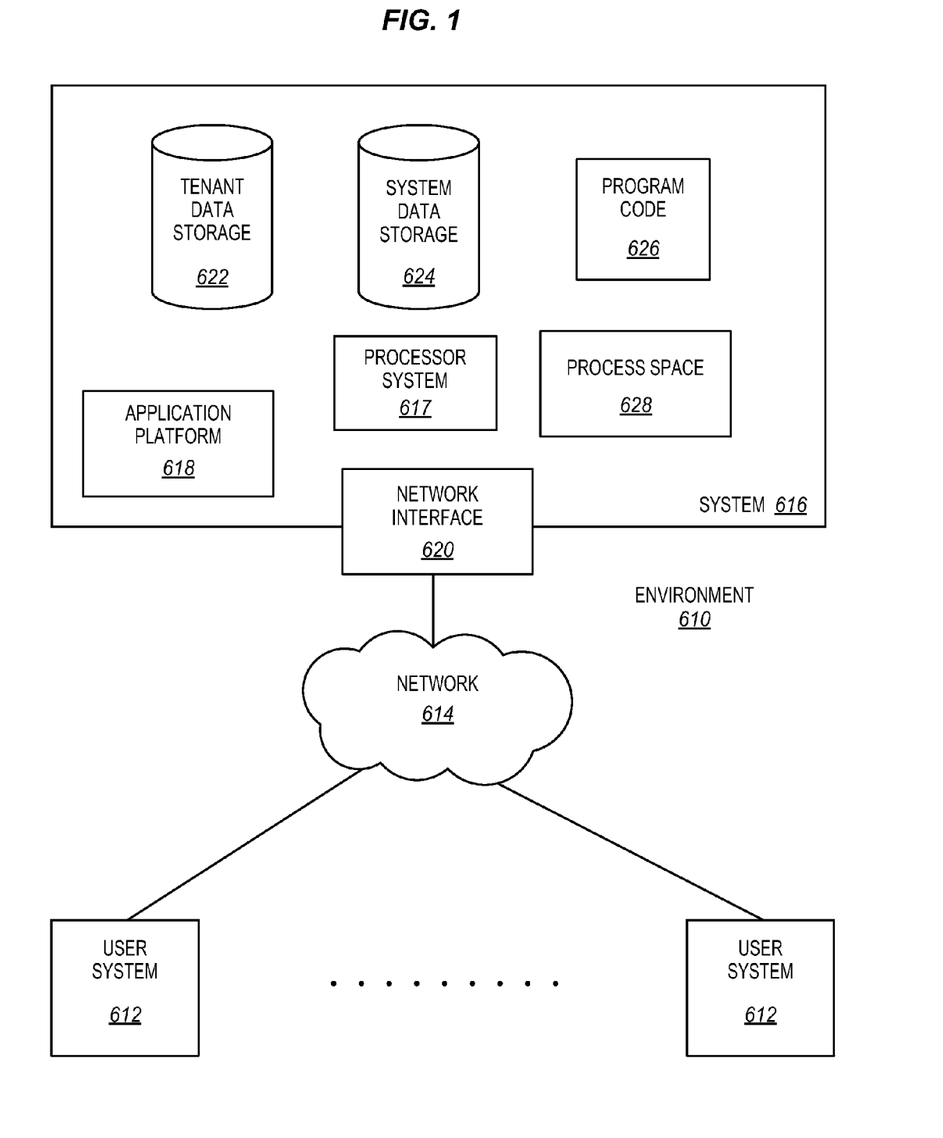
FIG. 1 illustrates a block diagram of an example of an environment wherein shared data sets might be used.
Figure 2:
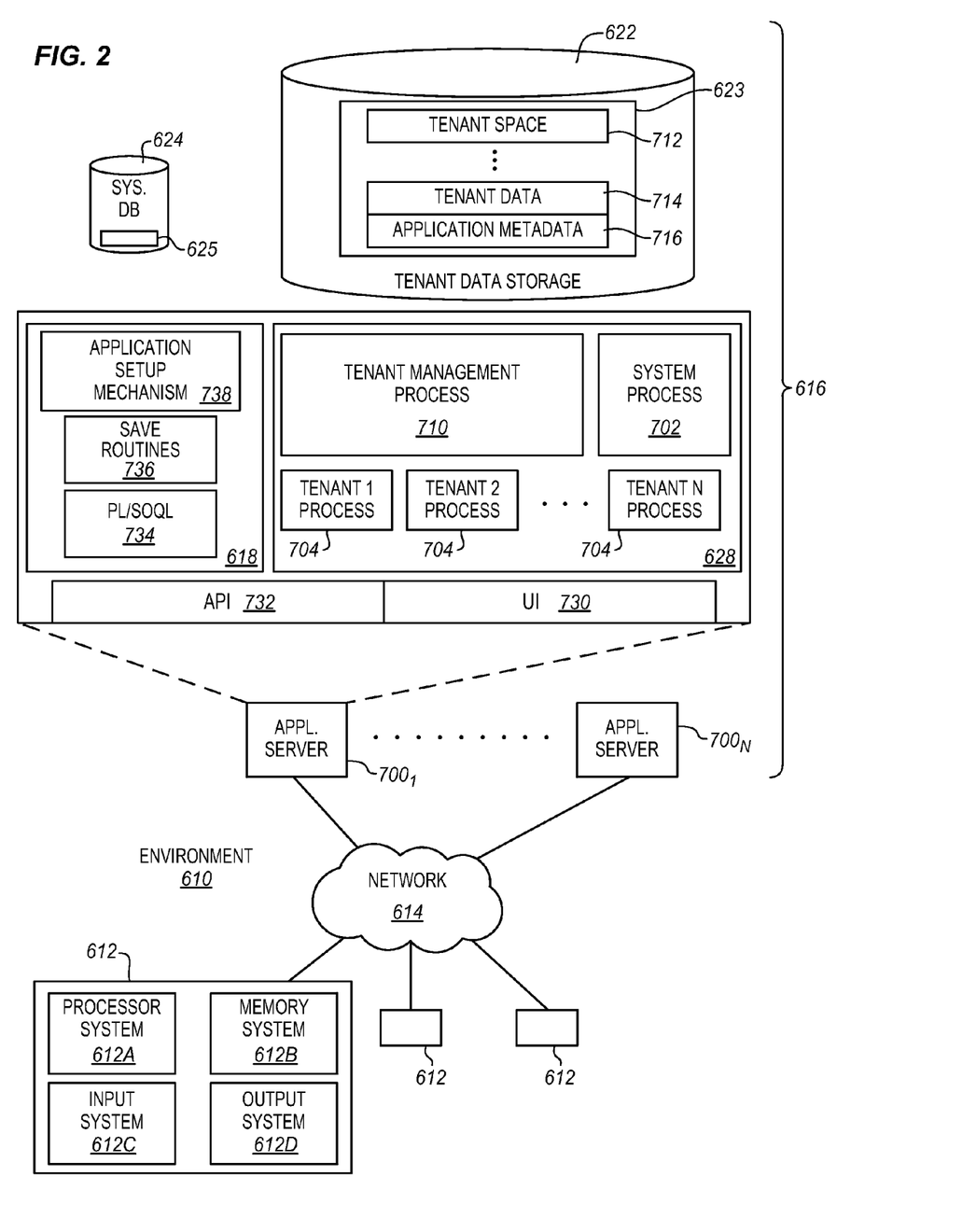
FIG. 2 illustrates a block diagram of an embodiment of elements of FIG. 1 and various possible interconnections between these elements.

The system of the present invention is shown in FIGS. 1 and 2 and includes a delta table. The delta table may be incorporated into the Tenant Data Storage 622 shown in the figures or as a separate shared store.

Marketplace for Shared Data Sets

In one implementation, a system, like the one described above or some other one, allows a data set provider (e.g. a provider in the data marketplace) to be able to offer access to data sets in its managed database. The underlying database can be relational, mapped, or implemented in some other way. Customers, through the system, can access the information from multiple data sets.

To facilitate access to the data sets, the system may have built in relationships that allow users to plug a data set bought in the marketplace into a shared data set or other database. Relationships can be built in and tied to the existing data model. The relationships can be standard and applicable to multiple objects. Moreover, the relationships can be based on standard objects or some set of custom objects. In one implementation, the custom objects are created before relationships between data sets are defined. The built-in relationships allow users to exchange data sets and combine data sets into a shared data set. For example, data bought on the marketplace can be plugged into the shared data set or other database.

To illustrate, assume a user maintains a list of zip codes. In one implementation, the user could also provide multiple child data sets related to zip codes so a consumer could look up the data set by zip code. For example, the user may provide health care provider information based on zip code data, or census information, or restaurant information, etc.

In this system, data sets are interrelated. In addition, this system can allow users to resolve inconsistencies in data and version history may also be built into the provided data sets. This system can be provided using the same hardware as for the relational shared data sets or using different hardware. The additional purchased data may be stored in the delta table for a particular user. Different users may go into the marketplace and buy additional data that is then stored in that user's delta table.

Common Objects in a Data Model

A system can provide a common schema that users can extend. Individual subscribers can customize a database using definitions available on a marketplace.

For example, in a multi-tenant environment, two service providers may install objects with the same name or that use a common shared data model. Where a common schema is defined, the schema allows multiple applications to be installed and work together. In this way, a customer is not stuck with a particular schema. They can extend it. In one implementation, individual applications can also extend the schema.

In one embodiment, a system similar to the one described above tracks changes to the metadata (e.g., the data defining a schema). In this way, individual subscribers can have their own view (or a modified view) of an object (like a Purchase Order) based on a common shared infrastructure. These views and other metadata may be provided and/or defined by the marketplace.

The marketplace and related application interface provide a better user experience. In one example, as described above, two applications have one schema. The applications present the data in very different ways and each extend the schema in different ways System Overview FIG. 1 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 1 (and in more detail in FIG. 2) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 1, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 2, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 2 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2 also illustrates environment 610. However, in FIG. 2 elements of system 616 and various interconnections in an embodiment are further illustrated. FIG. 2 shows that user system 612 may include processor system 612A, memory system 612B, input system 612C, and output system 612D. FIG. 2 shows network 614 and system 616. FIG. 2 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 2. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 2, system 616 may include a network interface 620 (of FIG. 2) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT DATABASE ON-DEMAND DATABASE SERVICE issued Jun. 1, 2010 to Craig Weissman, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

Process Overview

Figure 3:
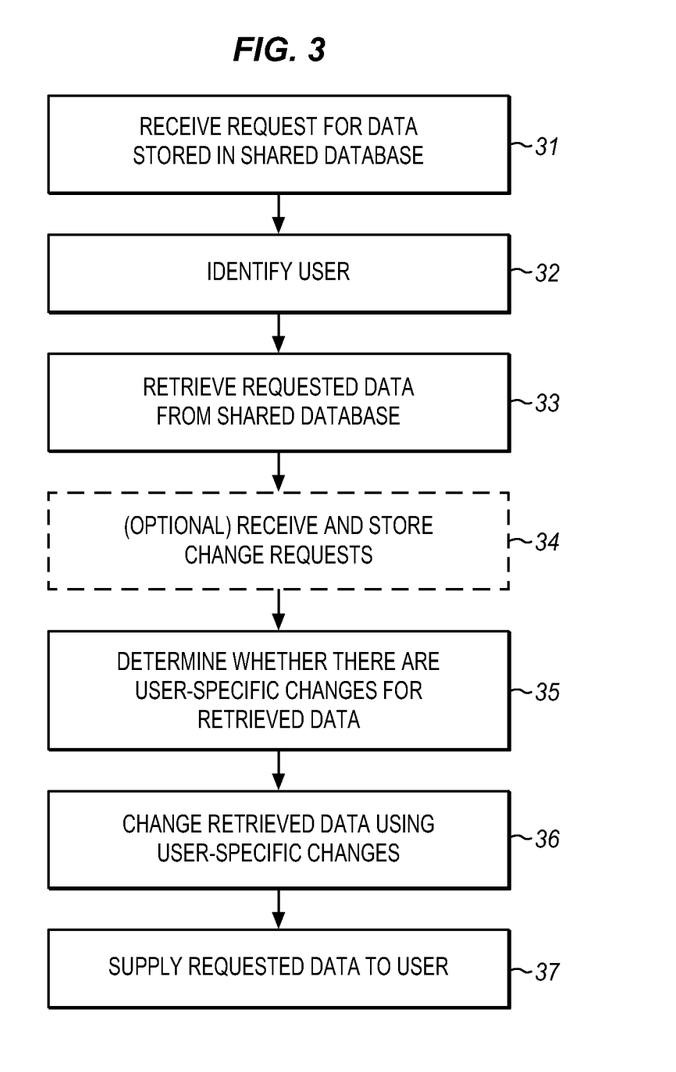
FIG. 3 is an operational flow diagram of providing unique data to one user or user group using a shared database in an embodiment.

FIG. 3 is a process flow diagram of providing unique data to one user or user group using a shared database. At 31, the system that has access to the shared database receives a request for data stored in the shared database from a user. The shared database may be housed locally or remotely. At 32, the system identifies the requesting user. Typically a user will log in to an account and provide credentials in some way. However, the system may identify the user based on the terminal used to access the data or in any of a variety of other ways.

At 33, the system retrieves the requested data from the shared database. This operation may be performed through a remote network connection or by accessing local data. In the case of a shared data, the user may be permitted access to only a portion of the data, for example, only some rows or some tables of the data. These rows or tables may be identified and only the permitted data from among all of the data requested by the user is retrieved.

At 34, in a separate and optional operation, the system may receive and store changes to the user's data before providing the data to the user. This may be performed in any of a variety of different ways including as described below in the context of FIG. 4. These changes may be received from a user or from a third party, for example a third party, may offer, provide, manage, or sell a package of modifications and enhancements to the data and this data may be provided by the system only to users who have licensed, purchased, or otherwise acquired rights to the changes. The user-specific changes may include overwrites of the user-specific changes from the user or the third party and may include an indication as to which user the user-specific changes apply.

At 35, the system determines whether there are any user-specific changes for the retrieved data. Since the retrieved data is from the shared data, any user-specific changes are applied before the data is provided to the user. The system may make this determination by checking a flag in the shared database or by referencing a delta table. The delta table contains user-specific changes referenced to the user data. The delta table may be a part of the shared database or it may be a separate data source. It may be located with the shared database or in a different remote location.

At 36 the retrieved data is changed using any user specific changes. As an example, if there is a flag in the shared database, then the system retrieves the data from the shared database, then accesses the delta table and changes the values in the retrieved data using the delta table. At 37, the changed data is supplied to the requesting user.

Figure 4:
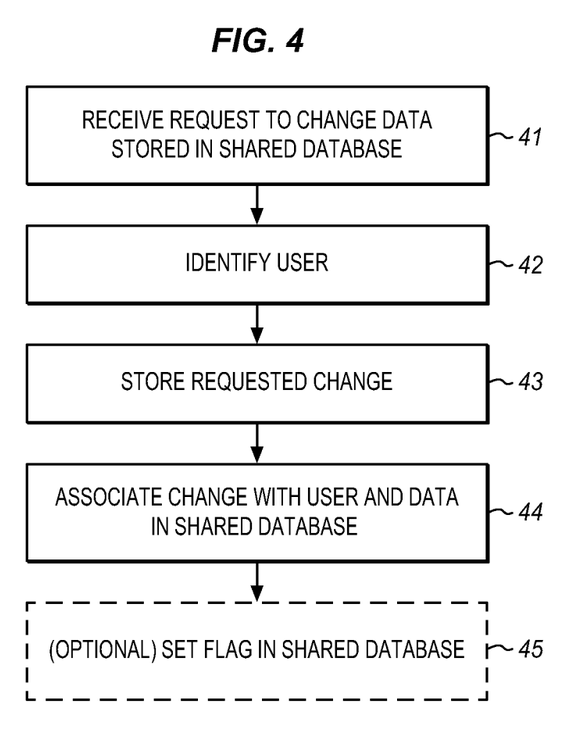
FIG. 4 is an operational flow diagram of receiving and storing changes to data in a shared database for a particular use in an embodiment.

FIG. 4 is a process flow diagram of receiving and storing changes to data in a shared database for a particular use. At 41, a request is received on behalf of a user to change data stored in a shared database. The request may be from the actual user, from a user is a user group that includes other users, or from a third party that maintains, manages, or sells data changes for particular users.

At 42, the user is identified to ensure that the changes are properly linked to the specific user on whose behalf the changes are being made.

At 43, the requested changes are stored. The changes are stored separate from the shared database so that the original data is not altered for other users. As described above a local or remote delta table may be used to store the user-specific change to the data. The delta table may be shared with many different users so that different user may have different changes to the same data that is stored in the shared database.

In order to simplify the operations, a third party or a user may supply the delta table and then maintain the delta table with any changes. The user-specific changes come in the form of the delta table and are stored as they are received. The changes may be associated or flagged in the shared database or if they have previously been associated or flagged, no additional action to make the association may be required.

At 44, the user-specific changes are associated with the user and with the data in the shared database. The specific user is the user for which the request was received. At 45 a flag is optionally set in the shared database indicating that the requested change has been stored separate from the stored database.

Figure 5:
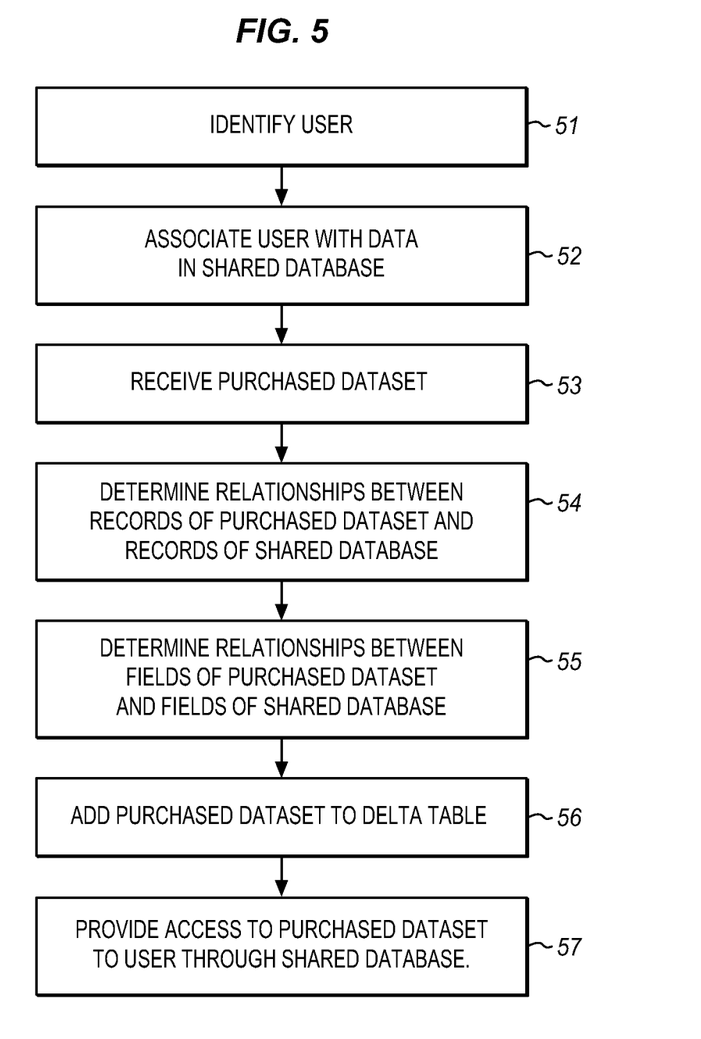
FIG. 5 is an operational flow diagram of applying purchased datasets to a shared database in an embodiment.

FIG. 5 is a process flow diagram of applying purchased datasets to a shared database. At 51, the system identifies a user and at 52, the system associates the user with a particular part of a shared database. As explained above, the user may have access to all or part of a database that is shared with other users.

At 53, the system receives a purchased dataset. The purchased dataset may be acquired from a third party seller or from a source that is affiliated or associated with the user. The purchased dataset may be found in a shared online marketplace of datasets. The marketplace may be open to anyone or only to those with particular credentials. While the dataset is described as purchased, this does not require a direct payment from the user to a dataset provider. The dataset may provider may be compensated in any of a variety of different ways, direct and indirect, or a combination.

At 54, the system determines relationships between records of the purchased dataset and records of the shared database. At 55, the system determine relationships between fields of the purchased dataset and the shared dataset. At 56, the system adds the purchased dataset to a delta table using the determined relationships between records and fields. The relationships allow the purchased data to be linked up with the pre-existing shared data. The relationship may be based on custom objects and may also be preconfigured. By providing preconfigured objects in the shared database, third party dataset providers can use the preconfigured objects to build relationships for their datasets. This allows the third party dataset to more easily be related to the shared database.

Similarly, the database administrator or some other knowledgeable entity can determine the parameters of the shared database and provide this information to internal or external dataset suppliers. The datasets that are offered in the marketplace may then be built around these data parameters. Customers, internal or external, with access to the shared database then benefit when the offered datasets are known to be built using the data parameters. The customer can purchase the dataset, acquire it, and import it into the system for application to a delta table.

In another implementation, the purchased dataset can be applied immediately. The shared dataset can be built up as a delta table from the start or converted to a delta table. In the marketplace, the customer may purchase or acquire rights to the new dataset and then this information is provided to an administrator of the shared database. The administrator may then import the dataset as a delta table or as a separate table to be reconfigured. Alternatively, if the delta table is already available to the shared database, then the administrator may simply add the appropriate references to the shared database to provide access to the pre-existing delta table to the user with newly acquired rights.

The delta table, as described above, allows different users to access the same shared database but see different data as differences from the delta table are applied to the data before it is provided to the user. Accordingly, at 57, the user is provided with access to the purchased dataset through data requests made to the shared dataset. The system receives the data request, fetches the requested data from the shared database and then makes any appropriate modifications based on the purchased dataset and then provides that to the user in the requested format. Flags, markers, pointer, indices, and other techniques may be placed into the shared database and into the delta table to ensure that the data is appropriate references as described above.

The purchased dataset may be combined with additional purchased datasets either as one delta table or as multiple delta tables. In either case, access to the purchased datasets may be provided simultaneously by the system through user requests to the shared database. The system can modify the requested data from the shared database using one or more delta tables. In addition, the purchased datasets may come in the form of multiple child datasets that are related to a particular field of the shared database. In this case, for example, a zip code field in the shared database may be linked to multiple child data sets that provide information associated with the zip code such as health care providers, census data, or restaurant information, etc.

Figure 6:
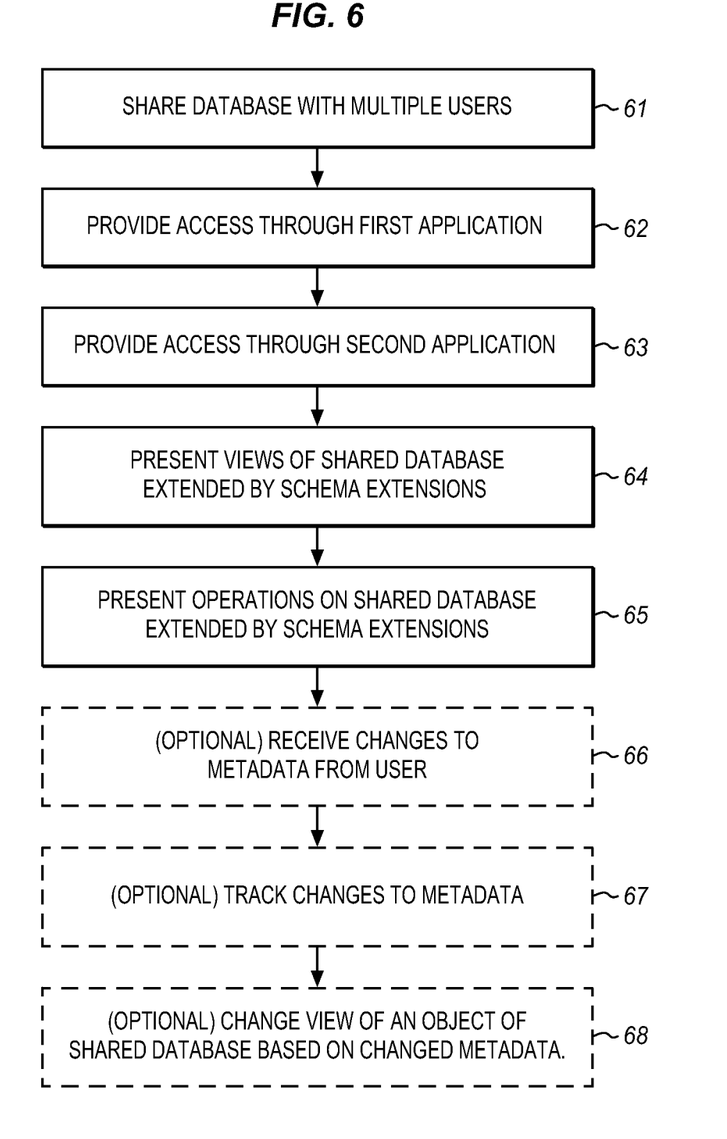
FIG. 6 is an operational flow diagram of extending a common schema of a shared database using applications in an embodiment.

FIG. 6 is a process flow diagram of extending a common schema of a shared database using applications. At 61, a shared database is shared with multiple users. The shared database is organized around a common schema, but the multiple users have access to different subsets of the data in the shared database.

At 62, access is provided to the shared database using the common schema through a first application. The first application has a first schema extension with a first set of additional objects. The first set of additional objects are defined by the first application. At 63 access is provided to the shared database through a second application. The second application has a second schema extension and a second set of additional objects that are defined by the second application. There may be many more than two applications depending on the number of users and the number of applications that each user has acquired and applied to the data. Two applications are described herein to show how different applications can extend the common schema differently.

At 64, views of the shared database are presented that are extended by the respective schema extensions of the first and second applications, respectively. The views may be different for the first and second applications if the schema extensions are different. Similarly at 65, operations on the shared database are presented that are extended by the respective schema extensions of the applications.

The schema extensions used by the applications may be offered in a marketplace to user of the shared database so that database definitions are purchased in the marketplace and then the shared database can be customized using the purchased definitions. The customizations may include additional objects, schema extensions and more. Since all of the additional components are applied to the same shared database, there may also be common elements. For example, some of the additional objects may use the same names. Some of the additional objects may also use the same data model. The data model may be the same in particular when it is based on the data model of the shared database.

FIG. 6 further includes some optional operations that may be used to further optimize or individualize the user's experience of the shared database. At 66, the system receives changed to the metadata from the user. When any one of the schemas is defined by metadata, changes to the metadata can change the schema. At 67, the application using the schema can track the changes to the metadata. At 68, the object views may be changed based on the changed metadata. In this way, individual subscribers can have their own view (or a modified view) of an object (like a Purchase Order) based on a common shared infrastructure.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus comprising:
a shared database organized around a common schema defined by metadata, the shared database being shared by multiple users having access to different subsets of the data in the shared database;
a first application to provide access to the shared database using the common schema, the first application having a purchased first schema extension received from a first identified user, the first schema extension being defined by metadata and having a first set of additional objects, the first set of additional objects being defined by the first application, the first schema extension making changes to the common schema metadata to change a view of an object of the shared database and wherein the first application tracks the changes to the common schema metadata; and
a second application to provide access to the shared database using the common schema, the second application having a second purchased schema extension received from a second identified user, the second schema extension having a second set of additional objects, the second set of additional objects being defined by the second application,
wherein the first and second applications present views of and operations on the shared database that are extended by the respective schema extension.

2. The apparatus of claim 1, wherein the first schema extension is purchased in a marketplace of schema extensions for the shared database.

3. The apparatus of claim 1, wherein at least a portion of the first and second sets of additional objects use the same names.

4. The apparatus of claim 1, wherein at least a portion of the first and second sets of additional objects use the same data model, the data model being based on the shared database.

5. The apparatus of claim 1, wherein changes to the metadata are changes by a user to change a view of an object in the shared database for that user and the first application tracks the changes made by the user to the metadata.

6. The apparatus of claim 5, wherein the changed view of an object of the shared database applies to that user with the first application.

7. A method comprising:
sharing a shared database with multiple users, the shared database being organized around a common schema defined by metadata, the multiple users having access to different subsets of the data in the shared database;
receiving a purchased first schema extension from a first identified user, the first schema extension making changes to the common schema metadata to change a view of an object of the shared database;
providing access to the shared database using the common schema, through a first application having the first schema extension, the first schema extension having a first set of additional objects, the first set of additional objects being defined by the first application wherein the first application tracks the changes to the common schema metadata;
receiving a purchased second schema extension from a second identified user;
providing access to the shared database using the common schema, through a second application having the second schema extension, the second schema extension having a second set of additional objects, the second set of additional objects being defined by the second application; and presenting views of and operations on the shared database that are extended by the respective schema extensions of the first and second applications.

8. The method of claim 7, further comprising purchasing database definitions in a marketplace and customizing the shared database using the purchased definitions.

9. The method of claim 7, wherein at least a portion of the first and second sets of additional objects use the same names.

10. The method of claim 7, wherein at least a portion of the first and second sets of additional objects use the same data model, the data model being based on the shared database.

11. The method of claim 7, wherein receiving changes to the metadata comprises receiving changes from the user to change a view of an object in the shared database for that user and wherein tracking the changes comprises tracking changes made by the user to the metadata through the first application.

12. The method of claim 11, wherein changing a view of an object of the shared database applies to that user with the first application based on the changed metadata.

13. A non-transitory machine-readable medium having instructions stored thereon that, when operated on by the machine, cause the machine to perform operations comprising:
    sharing a shared database with multiple users, the shared database being organized around a common schema defined by metadata, the multiple users having access to different subsets of the data in the shared database;
    receiving a purchased first schema extension from a first identified user, the first schema extension making changes to the common schema metadata to change a view of an object of the shared database;
    providing access to the shared database using the common schema, through a first application having the first schema extension, the first schema extension having a first set of additional objects, the first set of additional objects being defined by the first application wherein the first application tracks the changes to the common schema metadata;
    receiving a purchased second schema extension from a second identified user;
    providing access to the shared database using the common schema, through a second application having the second schema extension, the second schema extension having a second set of additional objects, the second set of additional objects being defined by the second application; and
    presenting views of and operations on the shared database that are extended by the respective schema extensions of the first and second applications.

14. The medium of claim 13, wherein the first schema extension is defined by metadata, and wherein receiving a purchased first schema extension comprises receiving changes to the metadata comprises receiving changes from the user to change a view of an object in the shared database for that user and wherein tracking the changes comprises tracking changes made by the user to the metadata through the first application.

15. The medium of claim 14, wherein changing a view of an object of the shared database applies to that user with the first application based on the changed metadata.

* * * * *